United States Patent
Watanabe

(10) Patent No.: US 11,175,218 B2
(45) Date of Patent: Nov. 16, 2021

(54) FLOW CELL AND DETECTOR EQUIPPED WITH THE FLOW CELL

(71) Applicant: SHIMADZU CORPORATION, Kyoto (JP)

(72) Inventor: Masato Watanabe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 185 days.

(21) Appl. No.: 16/604,999

(22) PCT Filed: Dec. 25, 2017

(86) PCT No.: PCT/JP2017/046276
§ 371 (c)(1),
(2) Date: Oct. 12, 2019

(87) PCT Pub. No.: WO2018/193666
PCT Pub. Date: Oct. 25, 2018

(65) Prior Publication Data
US 2020/0158626 A1    May 21, 2020

(30) Foreign Application Priority Data

Apr. 21, 2017 (JP) .............................. JP2017-084535

(51) Int. Cl.
*G01N 21/05* (2006.01)
*G01N 21/27* (2006.01)
*G01N 30/74* (2006.01)

(52) U.S. Cl.
CPC ............. *G01N 21/05* (2013.01); *G01N 21/27* (2013.01); *G01N 30/74* (2013.01); *G01N 2021/058* (2013.01)

(58) Field of Classification Search
CPC ........ G01N 21/05; G01N 21/27; G01N 30/74; G01N 2021/058; G01N 2021/416; G01N 21/4133; G01N 21/0303
See application file for complete search history.

(56) References Cited

U.S. PATENT DOCUMENTS

| | | |
|---|---|---|
| 5,734,468 A | 3/1998 | McNeal |
| 2012/0184722 A1 | 7/2012 | Samper |

(Continued)

FOREIGN PATENT DOCUMENTS

| | | |
|---|---|---|
| JP | H10-153597 A | 7/1998 |
| JP | 2010-071660 A | 4/2010 |

(Continued)

OTHER PUBLICATIONS

International Search Report for corresponding Application No. PCT/JP2017/046276, dated Mar. 6, 2018.

(Continued)

*Primary Examiner* — Benjamin R Schmitt
(74) *Attorney, Agent, or Firm* — Renner, Otto, Boisselle & Sklar, LLP

(57) ABSTRACT

A flow cell includes a cell into which a liquid to be measured is introduced and is arranged so that a measurement light to be used for measuring an optical characteristic of the liquid enters one side of the cell and exits from the other side of the cell, an inlet for leading the liquid to flow into the cell, and an outlet for leading the liquid in the cell to flow out from the cell. The inlet and the outlet are provided to form an interface between a liquid flowing into the cell through the inlet and a liquid with which the cell has been already filled at two places on an optical path of the measurement light passing through the cell.

5 Claims, 2 Drawing Sheets

(56) References Cited

U.S. PATENT DOCUMENTS

2014/0063496 A1    3/2014  Owa
2015/0276588 A1*  10/2015  Marshall ................ G01N 21/05
                                                          250/343

FOREIGN PATENT DOCUMENTS

JP    2012-220324 A    11/2012
JP    2013-507616 A     3/2013
JP    2014-048176 A     3/2014

OTHER PUBLICATIONS

Written Opinion for corresponding Application No. PCT/JP2017/046276, dated Mar. 6, 2018.
Notice of Reasons for Rejection for corresponding Japanese Patent Application No. 2019-513223 dated May 12, 2020.

* cited by examiner

Embodiment

FLOW CELL AND DETECTOR EQUIPPED WITH THE FLOW CELL

TECHNICAL FIELD

The present invention relates to a flow cell for a detector to be used in an analyzer such as a liquid chromatograph and a detector equipped with the flow cell.

BACKGROUND ART

A detector utilizing light is typically used as a detector for a liquid chromatograph. Such a detector includes a flow cell disposed on an optical path of light from a light source, the flow cell having an internal space (cell) through which liquid flows. The detector is configured to detect the light passing through the flow cell with a light sensor (see Patent Document 1). Through the detection of the light passing through the flow cell, changes in absorbance and refractive index due to an influence of the liquid flowing through the cell are measured, and components of a sample are detected and quantified.

PRIOR ART DOCUMENTS

Patent Documents

Patent Document 1: Japanese Patent Laid-open Publication No. 2014-048176

SUMMARY OF THE INVENTION

Problems to be Solved by the Invention

As an example, when a liquid different from a liquid with which the cell has been filled is introduced into the cell during analysis, such as a change in mobile phase composition or an inflow of a sample solvent, a difference in refractive index appears at an interface between the liquid that is originally present in the cell and the different liquid newly introduced into the cell. When such an interface is formed in the cell, the light passing through the flow cell is refracted at the interface, and as a result, the amount of light passing through the flow cell changes, or the optical path changes due to bending of an optical axis, which is detected as a change in amount of light or a change in refraction index. These changes are not reactions of a sample to be measured, but a pseudo peak (a peak that is not a component peak of the sample) is formed, which may affect analysis accuracy.

It is therefore an object of the present invention to reduce an influence of light refraction at a liquid interface in a cell of a flow cell.

Solutions to the Problems

A flow cell according to the present invention includes a cell into which a liquid to be measured is introduced and is arranged so that a measurement light to be used for measuring an optical characteristic of the liquid enters one side of the cell and exits from the other side of the cell, an inlet for leading the liquid to flow into the cell, and an outlet for leading the liquid in the cell to flow out from the cell. In such a flow cell, the inlet and the outlet are provided to form an interface between a liquid flowing into the cell through the inlet and a liquid with which the cell has been already filled at two places on an optical path of the measurement light passing through the cell.

In the conventional flow cell, an inlet for leading a liquid to flow into a cell is provided on one end side of the cell, and an outlet for leading a liquid to flow out of the cell is provided on the other end side of the cell. This configuration causes, when a liquid different from a liquid with which the cell has been filled flows into the cell through the inlet, only one interface that refracts the measurement light passing through the cell to be formed on the optical path of the measurement light. However, it is impossible to eliminate such an interface.

Therefore, the present inventor has come up with the idea of reducing the influence of the refraction of the measurement light at an interface formed in the cell by forming an interface that refracts the measurement light at two places on the optical path of the measurement light to cause refraction of the measurement light at one of the interfaces and refraction at the other interface to cancel each other out. The present invention has been made based on such an idea.

In the flow cell according to the present invention, the inlet and the outlet are provided to form an interface between a liquid flowing into the cell through the inlet and a liquid with which the cell has been already filled at two places on the optical path of the measurement light passing through the cell. This causes the measurement light to be refracted in directions opposite to each other when the measurement light passes through the two interfaces to cause refraction at one of the interfaces and refraction at the other interface to cancel each other out, thereby reducing the influence of refraction of the measurement light at the interfaces in the cell.

In a preferred embodiment of the flow cell according to the present invention, the inlet is provided at a position between the one end of the cell and the other end of the cell so that the liquid flows into the cell in a direction substantially orthogonal to a travel direction of the measurement light. When the inlet is provided at a position between the one end of the cell and the other end of the cell, an interface with the liquid with which the cell has been already filled is formed on both sides of the liquid flowing into the cell through the inlet.

In a further preferred embodiment, the inlet is provided at a center of the cell between the one end and the other end, and the outlet is provided at two places. One of the two places is adjacent to the one end of the cell and the other is adjacent to the other end of the cell. This causes the liquid flowing into the cell through the inlet to flow in the cell to spread uniformly toward both the sides of the cell, thereby forming interfaces on both the sides of the liquid flowing into the cell in a symmetrical manner. When the interfaces formed on both the sides of the liquid flowing into the cell are symmetric, the refraction of the measurement light at one of the interfaces and the refraction at the other interface easily cancel each other out, thereby further reducing the influence of refraction at the interfaces in the cell.

A detector according to the present invention includes a light source, the flow cell described above, a light sensor for detecting light which passed through the flow cell, and an optical system for guiding light from the light source to the flow cell and guiding light that has passed through the flow cell to the light sensor.

Effects of the Invention

In the flow cell according to the present invention, the inlet and the outlet are provided to form an interface between a liquid flowing into the cell through the inlet and a liquid with which the cell has been already filled at two places on the optical path of the measurement light passing through the cell. This causes the measurement light to be refracted in directions opposite to each other when the measurement light passes through the two interfaces to cause refraction at one of the interfaces and refraction at the other interface to cancel each other out, thereby reducing the influence of refraction of the measurement light at the interfaces in the cell.

EMBODIMENT OF THE INVENTION

Hereinafter, a description will be given of an embodiment of a flow cell according to the present invention and an embodiment of a detector equipped with the flow cell with reference to the drawings.

Figure 1:
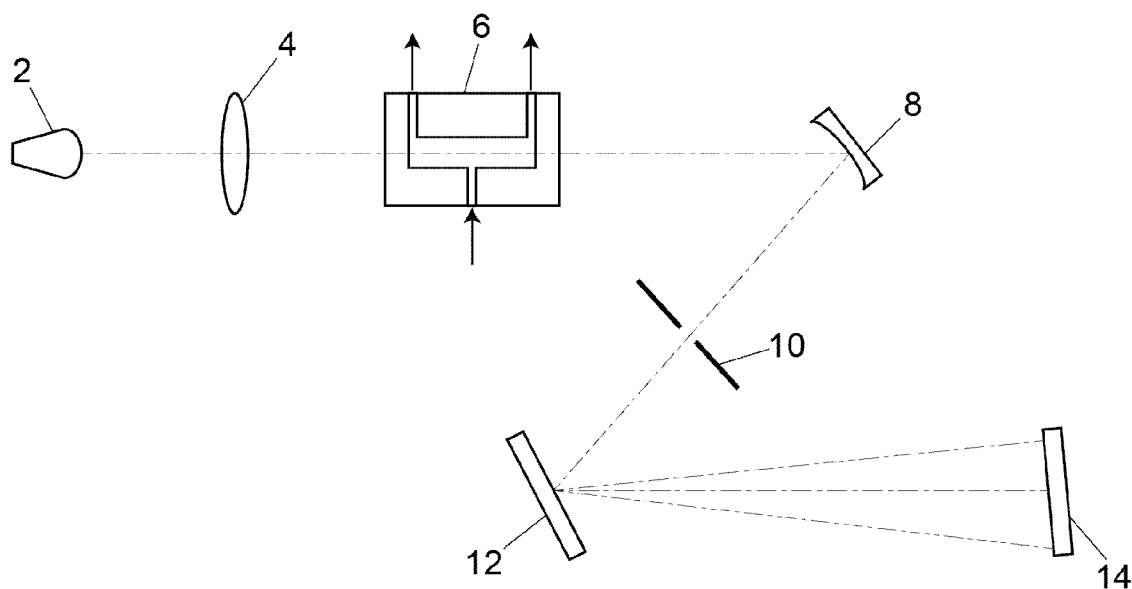
FIG. 1 is a schematic configuration diagram showing an embodiment of a detector.

First, a description will be given of a configuration of the embodiment of the detector with reference to the schematic configuration diagram of FIG. 1.

The detector of the present embodiment includes a light source 2, a condenser 4, a flow cell 6, a mirror 8, an entrance slit 10, a spectroscope 12, and a light sensor 14. The light sensor 14 is, for example, a photodiode array.

The condenser 4 and the flow cell 6 are arranged on an optical path of measurement light emitted from the light source 2, and the measurement light emitted from the light source 2 is projected to the flow cell 6 through the condenser 4. A solution that has passed through a separation column of a liquid chromatograph flows through the flow cell 6.

The mirror 8 is disposed to reflect the measurement light passing through the flow cell 6 toward the entrance slit 10, and accordingly, the measurement light passing through the entrance slit 10 is guided to the spectroscope 12 such as a diffraction grating. The light guided to the spectroscope 12 is split into separate wavelength components and enters the light sensor 14.

The light sensor 14 is configured to detect intensity of each wavelength component of the light and generate a detection signal in proportion to the intensity. Although not shown in the drawings, the light sensor 14 is connected with an arithmetic processor implemented by a dedicated computer or a general-purpose computer. The arithmetic processor obtains an absorbance spectrum of the liquid flowing through the flow cell 6 based on intensity of the detection signal obtained by the light sensor 14, and detects and quantifies components of a sample. Note that, according to the present embodiment, a configuration of an absorbance detector has been given as an example of the detector, but the present invention is not limited to such a configuration and is applicable to a differential refractive index detector.

A description will be given of the flow cell 6 with reference to FIG. 2.

The flow cell 6 is formed of a block that is made of a light transmitting material such as quartz. Provided inside the flow cell 6 are a cell 18 that is a space through which the liquid flows, and an inlet 20 that is a flow path through which the liquid is introduced into the cell 18, and outlets 22a, 22b that are flow paths through which the liquid flows out of the cell 18. The flow cell 6 is disposed on an optical axis of the measurement light so that the measurement light enters one end side of the cell 18 (the left side of FIG. 2) and exits from the other end side (the right side of FIG. 2).

The inlet 20 is provided at a substantially center between the one end of the cell 18 and the other end of the cell 18, the inlet 20 extending in a direction that is substantially orthogonal to the optical axis of the measurement light passing through the cell 18 and in which the liquid flows into the cell 18.

The outlet 22a is provided at the one end of the cell 18 on the opposite side from the inlet 20 with the cell 18 interposed between the outlet 22a and the inlet 20. The outlet 22b is provided at the other end of the cell 18 on the opposite side from the inlet 20 with the cell 18 interposed between the outlet 22b and the inlet 20.

Figure 2:
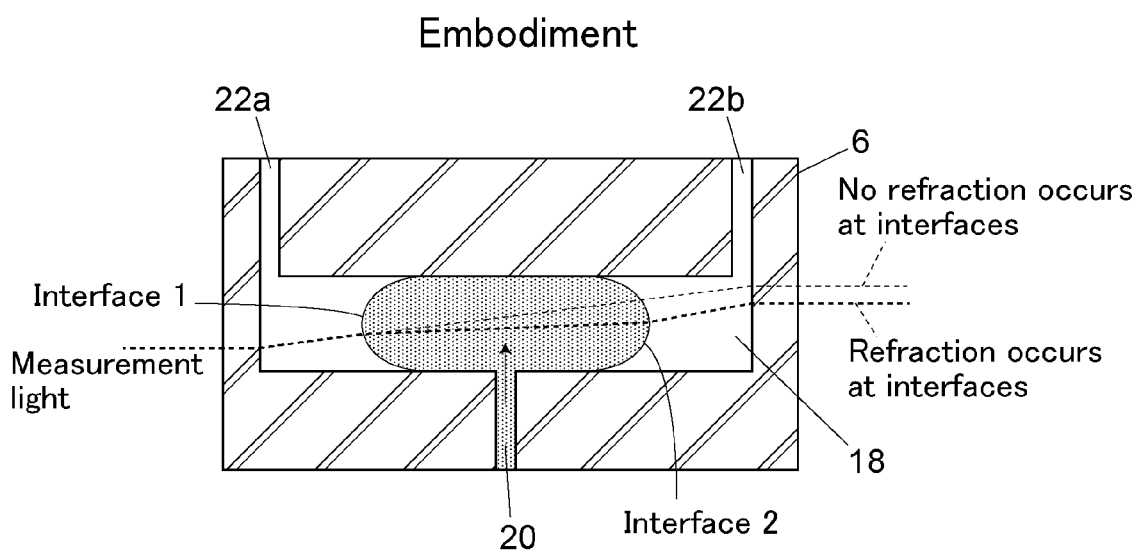
FIG. 2 is a cross-sectional view showing a flow cell of the same embodiment.

Such a structure of the flow cell 6 causes, as shown by an embossed pattern in FIG. 2, the liquid flowing into the cell 18 from the center of the cell 18 through the inlet 20 to spread toward both the outlets 22a, 22b to fill the cell 18. As a result, interfaces 1 and 2 with a liquid with which the cell 18 has been already filled are formed on both sides of the liquid introduced into the cell 18. When the liquid with which the cell 18 has been already filled is different from the liquid newly introduced into the cell 18, differences in refractive index appear at the interfaces 1 and 2 between these liquids, thereby causing the measurement light passing from the one side of the cell 18 (the left side of FIG. 2) to the other side (the right side of FIG. 2) to be refracted at each of the interfaces 1 and 2.

Figure 3:
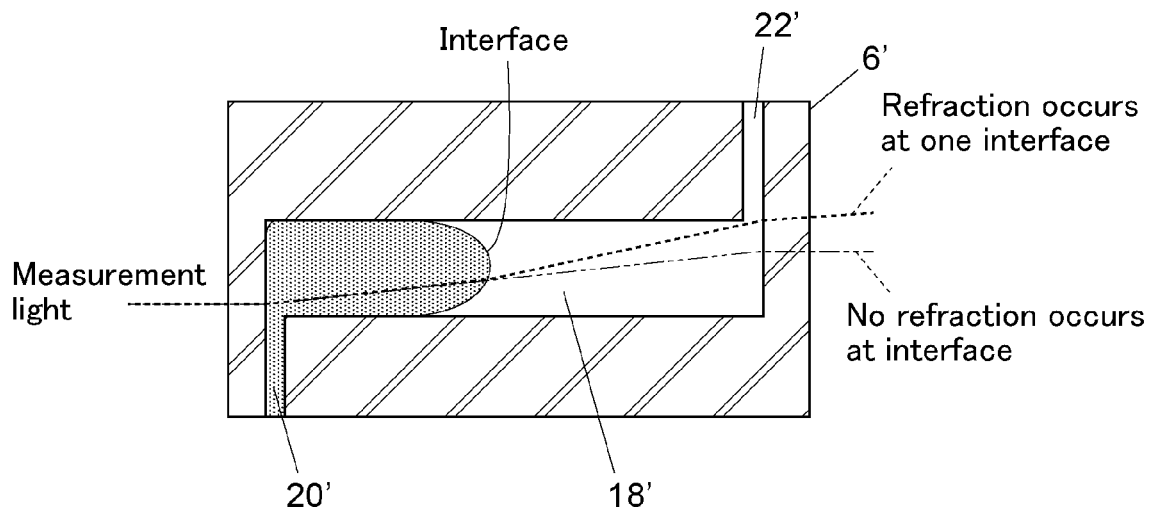
FIG. 3 is a cross-sectional view showing a flow cell having a conventional structure (comparative example).

FIG. 3 shows a structure of a flow cell 6' having a general structure as a comparative example. Since the conventional general flow cell 6' includes an inlet 20' at one end (or the other end) of a cell 18' and an outlet 22' at the other end (or the one end), only one interface is formed between a liquid introduced into the cell 18' through the inlet 20' and a liquid with which the cell 18' has been already filled. This causes the measurement light passing through the cell 18' to be refracted at the one interface formed when a sample solvent or the like is introduced into the cell 18', which results in a change in optical path or exit position from the cell 18' of the measurement light. This change may be detected as a change in absorbance or refractive index of the liquid flowing through the cell 18'.

On the other hand, as shown in FIG. 2, the configuration where the two interfaces 1 and 2 are formed when the liquid is introduced into the cell 18 causes the measurement light passing through the cell 18 to be refracted at the interface 1 and the interface 2 in directions that cause the refraction at the interface 1, and the refraction at the interface 2 to cancel each other out. Therefore, as compared to the configuration where only one interface is formed as shown in FIG. 3, a change in optical path or exit position of the measurement light becomes small.

Figure 4:
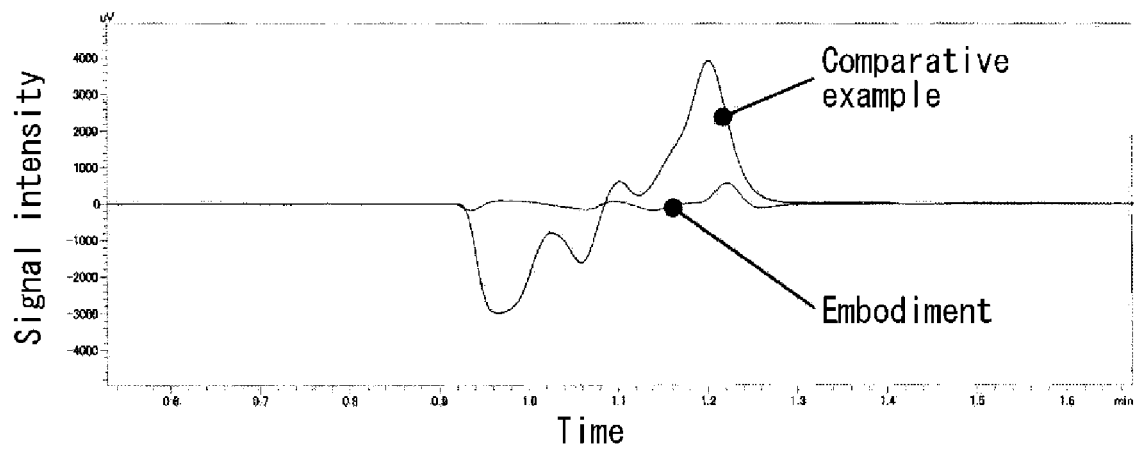
FIG. 4 is a graph showing changes in signal when a solvent is introduced into the flow cell of the embodiment and the flow cell of the comparative example.

FIG. 4 shows detection signal data when a solvent is introduced into each of the flow cell 6 having the structure shown in FIG. 2 (embodiment) and the flow cell 6' having the conventional structure shown in FIG. 3 (comparative example). As apparent from this data, in the flow cell 6' having the conventional structure (comparative example), when the solvent is introduced into the cell 18', the detection signal fluctuates greatly to form a pseudo peak. On the other hand, in the flow cell 6 of the present embodiment, the data reveals that the fluctuation of the detection signal when the solvent is introduced into the cell 18 is suppressed, and the influence of refraction of the measurement light at the interfaces formed in the cell 18 is reduced.

As described above, the present invention is intended to suppress the influence of refraction of the measurement light at the interfaces formed in the cell 18 with the structure of the flow cell 6 that forms, when a different liquid is introduced into the cell 18, the two interfaces 1 and 2 on both sides of the liquid. Accordingly, the inlet 20 and the outlets 22*a*, 22*b* may be provided at any positions as long as the two interfaces are formed so as to cause refraction of the measurement light passing through the cell at one of the interfaces and refraction at the other interface to cancel each other out.

DESCRIPTION OF REFERENCE SIGNS

2: Light source
4: Condenser
6: Flow cell
8: Mirror
10: Entrance slit
12: Spectroscope
14: Light sensor
18: Cell
20: Inlet
22*a*, 22*b*: Outlet

The invention claimed is:

1. A flow cell comprising:
a cell into which a liquid to be measured is introduced and is arranged so that a measurement light to be used for measuring an optical characteristic of the liquid enters one side of the cell and exits from the other side of the cell;
an inlet for leading the liquid to flow into the cell; and
an outlet for leading the liquid in the cell to flow out from the cell, wherein
the inlet and the outlet are provided to form an interface between the liquid flowing into the cell through the inlet and another liquid with which the cell has been already filled at two places on an optical path of the measurement light passing through the cell, a flowing direction of the liquid in the cell being substantially parallel to the optical path of the measurement light passing through the cell.

2. The flow cell according to claim 1, wherein
the inlet is provided at a position between the one end of the cell and the other end of the cell so that the liquid flows into the cell in a direction substantially orthogonal to a travel direction of the measurement light.

3. The flow cell according to claim 2, wherein
the inlet is provided at a center of the cell between the one end and the other end, and the outlet is provided at two places, one of the two places is adjacent to the one end of the cell and the other is adjacent to the other end of the cell.

4. A detector comprising:
a light source;
the flow cell according to claim 1;
a light sensor for detecting light which passed through the flow cell; and
an optical system for guiding light from the light source to the flow cell and guiding light that has passed through the flow cell to the light sensor.

5. The flow cell according to claim 1, wherein
the interfaces between the liquid and the another liquid respectively formed at the two places extend in a direction perpendicular to a direction in which the liquid and another liquid flow through the cell at the interfaces.

* * * * *